United States Patent
Myung et al.

(10) Patent No.: US 9,898,111 B2
(45) Date of Patent: Feb. 20, 2018

(54) TOUCH SENSITIVE DEVICE AND METHOD OF TOUCH-BASED MANIPULATION FOR CONTENTS

(71) Applicant: Samsung Electronics Co., Ltd, Gyeonggi-do (KR)

(72) Inventors: Jihye Myung, Gyeonggi-do (KR); Sanghyuk Koh, Jeju-do (KR); Taeyeon Kim, Seoul (KR); Hyunmi Park, Seoul (KR); Chihoon Lee, Seoul (KR); Hyemi Lee, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 14/011,549

(22) Filed: Aug. 27, 2013

(65) Prior Publication Data
US 2014/0055398 A1    Feb. 27, 2014

(30) Foreign Application Priority Data
Aug. 27, 2012  (KR) ......................... 10-2012-0093925

(51) Int. Cl.
*G06F 3/0354* (2013.01)
*G06F 3/041* (2006.01)
*G06F 3/0488* (2013.01)

(52) U.S. Cl.
CPC .......... *G06F 3/041* (2013.01); *G06F 3/03542* (2013.01); *G06F 3/04883* (2013.01); *G06F 2203/04807* (2013.01)

(58) Field of Classification Search
CPC ............... G06F 3/0346; G06F 3/03545; G06F 3/03547; G06F 3/0383; G06F 2203/04807; G06F 3/041; G06F 3/04883; G06F 3/03542
USPC ..... 345/173–179; 178/18.01–20.01; 715/863
See application file for complete search history.

(56) References Cited

U.S. PATENT DOCUMENTS

| | | | |
|---|---|---|---|
| 5,539,427 A | 7/1996 | Bricklin et al. | |
| 5,867,150 A * | 2/1999 | Bricklin et al. | ............. 345/173 |
| 7,554,530 B2 | 6/2009 | Mizobuchi et al. | |
| 8,432,415 B2 * | 4/2013 | Chen et al. | ................... 345/661 |
| 8,643,605 B2 * | 2/2014 | Yu et al. | ....................... 345/173 |
| 8,806,373 B2 | 8/2014 | Yamamoto et al. | |
| 8,878,785 B1 * | 11/2014 | Nordstrom | .......... G06F 3/04883 345/157 |
| 2004/0021647 A1 * | 2/2004 | Iwema | .................. G06F 3/0488 345/179 |
| 2004/0119763 A1 | 6/2004 | Mizobuchi et al. | |
| 2004/0257346 A1 * | 12/2004 | Ong et al. | ..................... 345/179 |

(Continued)

FOREIGN PATENT DOCUMENTS

WO    WO 2012066591 A1    5/2012

OTHER PUBLICATIONS

Extended European Search Report dated Feb. 19, 2015 in connection with European Patent Application No. 13181641.5; 7 pages.

*Primary Examiner* — Hong Zhou

(57) ABSTRACT

A touch sensitive device allows a touch-based manipulation for contents displayed thereon. In a method, the device receives a predefined input event when a content screen is displayed on a display unit, determines whether a closed curve is formed on the display unit by the input event, and crops a specific content region defined by the closed curve.

18 Claims, 12 Drawing Sheets

(56) References Cited

U.S. PATENT DOCUMENTS

| | | | |
|---|---|---|---|
| 2005/0093868 A1* | 5/2005 | Hinckley | 345/502 |
| 2005/0198591 A1* | 9/2005 | Jarrett et al. | 715/863 |
| 2005/0237308 A1* | 10/2005 | Autio et al. | 345/173 |
| 2006/0023077 A1 | 2/2006 | Alton et al. | |
| 2007/0115264 A1* | 5/2007 | Yu et al. | 345/173 |
| 2009/0100383 A1 | 4/2009 | Sunday et al. | |
| 2009/0193366 A1* | 7/2009 | Davidson | 715/863 |
| 2011/0007029 A1* | 1/2011 | Ben-David | G06F 3/044 345/174 |
| 2011/0059759 A1* | 3/2011 | Ban | 455/466 |
| 2011/0219333 A1* | 9/2011 | Park | H04M 1/72583 715/808 |
| 2011/0297457 A1* | 12/2011 | Yeh et al. | 178/19.01 |
| 2011/0302529 A1 | 12/2011 | Yamamoto et al. | |
| 2011/0310034 A1* | 12/2011 | Ouchi et al. | 345/173 |
| 2012/0092269 A1* | 4/2012 | Tsai et al. | 345/173 |
| 2012/0110519 A1* | 5/2012 | Werner et al. | 715/863 |
| 2012/0235946 A1* | 9/2012 | Zotov et al. | 345/173 |
| 2012/0306781 A1* | 12/2012 | Hwang et al. | 345/173 |
| 2013/0191784 A1 | 7/2013 | Noto | |

* cited by examiner

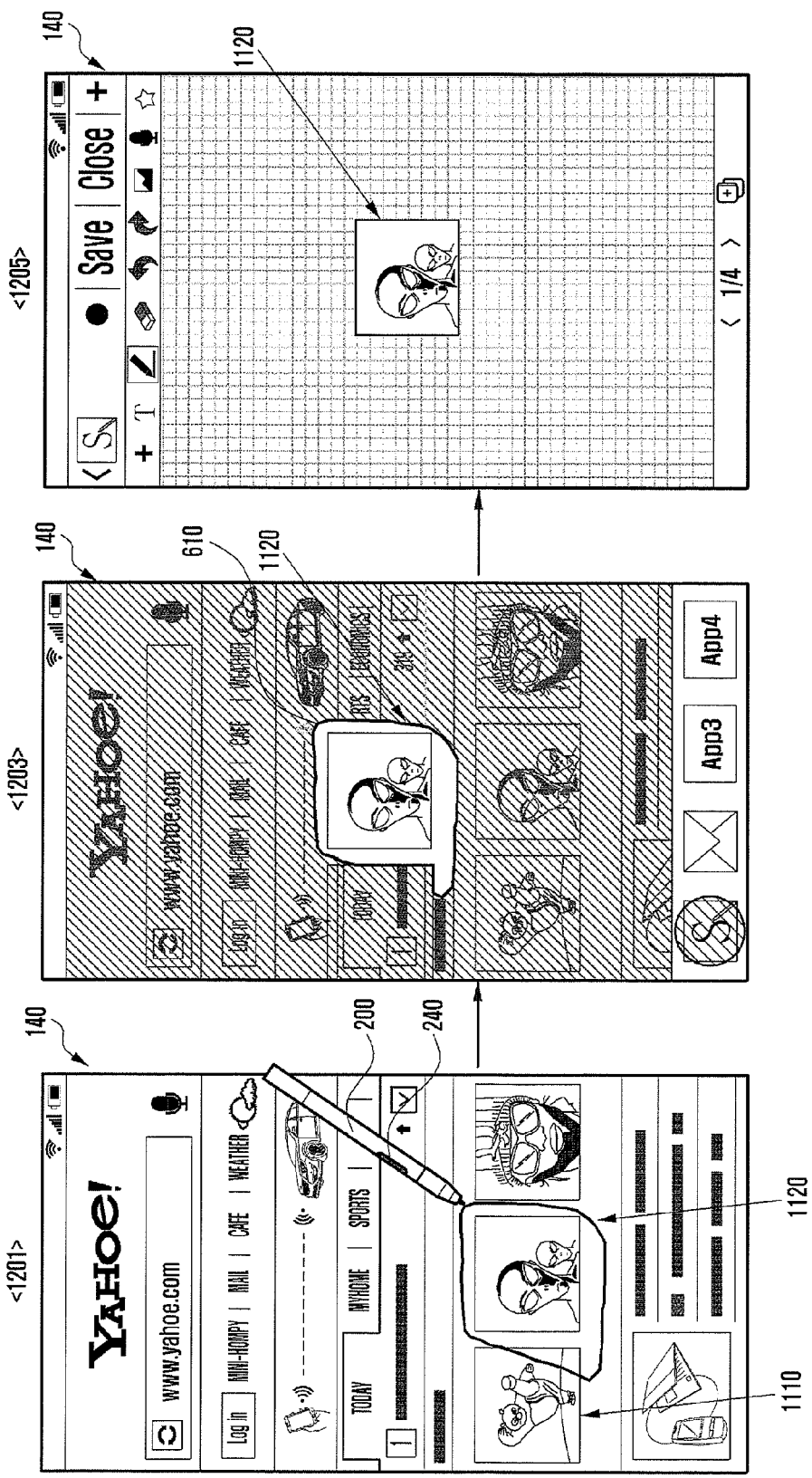

TOUCH SENSITIVE DEVICE AND METHOD OF TOUCH-BASED MANIPULATION FOR CONTENTS

CROSS-REFERENCE TO RELATED APPLICATION(S) AND CLAIM OF PRIORITY

The present application is related to and claims the benefit under 35 U.S.C. § 119(a) of a Korean patent application filed on Aug. 27, 2012 in the Korean Intellectual Property Office and assigned Serial No. 10-2012-0093925, the entire disclosure of which is hereby incorporated by reference.

TECHNICAL FIELD OF THE INVENTION

The present disclosure relates to a touch sensitive device and, more particularly, to a touch-based manipulation for contents displayed on the device.

BACKGROUND OF THE INVENTION

With remarkable growth of related technologies, a great variety of mobile devices (e.g., smart phones or tablet PCs) are increasingly popular due to their high usability and good portability. Particularly, mobile devices today are outgrowing their respective traditional fields and are reaching a mobile convergence stage in which a single mobile device has the ability to support various user functions.

Many mobile devices employ a touch screen that displays various contents thereon and facilitates a more intuitive use of these contents through a touch-based manipulation from a user. Normally such a mobile device offers a function to edit contents.

Some edit functions for contents involve activating a particular edit program associated with selected content, retrieving the selected content in a specific form defined in the particular edit program, and editing the retrieved content according to certain rules. Unfortunately, this may lower the continuity of works, and a user may often have a negative experience due to the number of steps required.

SUMMARY OF THE INVENTION

To address the above-discussed deficiencies of the prior art, it is a primary object to provide a touch sensitive device that allows a touch-based manipulation for contents displayed thereon.

According to one aspect of the present disclosure, a touch-based content manipulation method in a touch sensitive device is provided. The method includes receiving a predefined input event when a content screen is displayed on a display unit. The method also includes determining whether a closed curve is formed on the display unit by the input event. The method further includes cropping a specific content region defined by the closed curve.

According to another aspect of the present disclosure, a touch sensitive device for supporting a touch-based content manipulation is provided. The device includes a display unit configured to display a content screen. The device also includes a control unit configured to receive a predefined input event when the content screen is displayed on the display unit, determine whether a closed curve is formed on the display unit by the input event, and crop a specific content region defined by the closed curve.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates the acquisition of a content region in accordance with another embodiment of the present disclosure.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Example, non-limiting embodiments of the present disclosure will now be described more fully with reference to the accompanying drawings. This disclosure may, however, be embodied in many different forms and should not be construed as limited to the embodiments set forth herein. Rather, the disclosed embodiments are provided so that this disclosure will be thorough and complete, and will fully convey the scope of the disclosure to those skilled in the art. The principles and features of this disclosure may be employed in varied and numerous embodiments without departing from the scope of the disclosure.

Furthermore, well known or widely used techniques, elements, structures, and processes may not be described or illustrated in detail to avoid obscuring the essence of the present disclosure. Although the drawings represent example embodiments of the disclosure, the drawings are not necessarily to scale and certain features may be exaggerated or omitted in order to better illustrate and explain the present disclosure.

Figure 1:
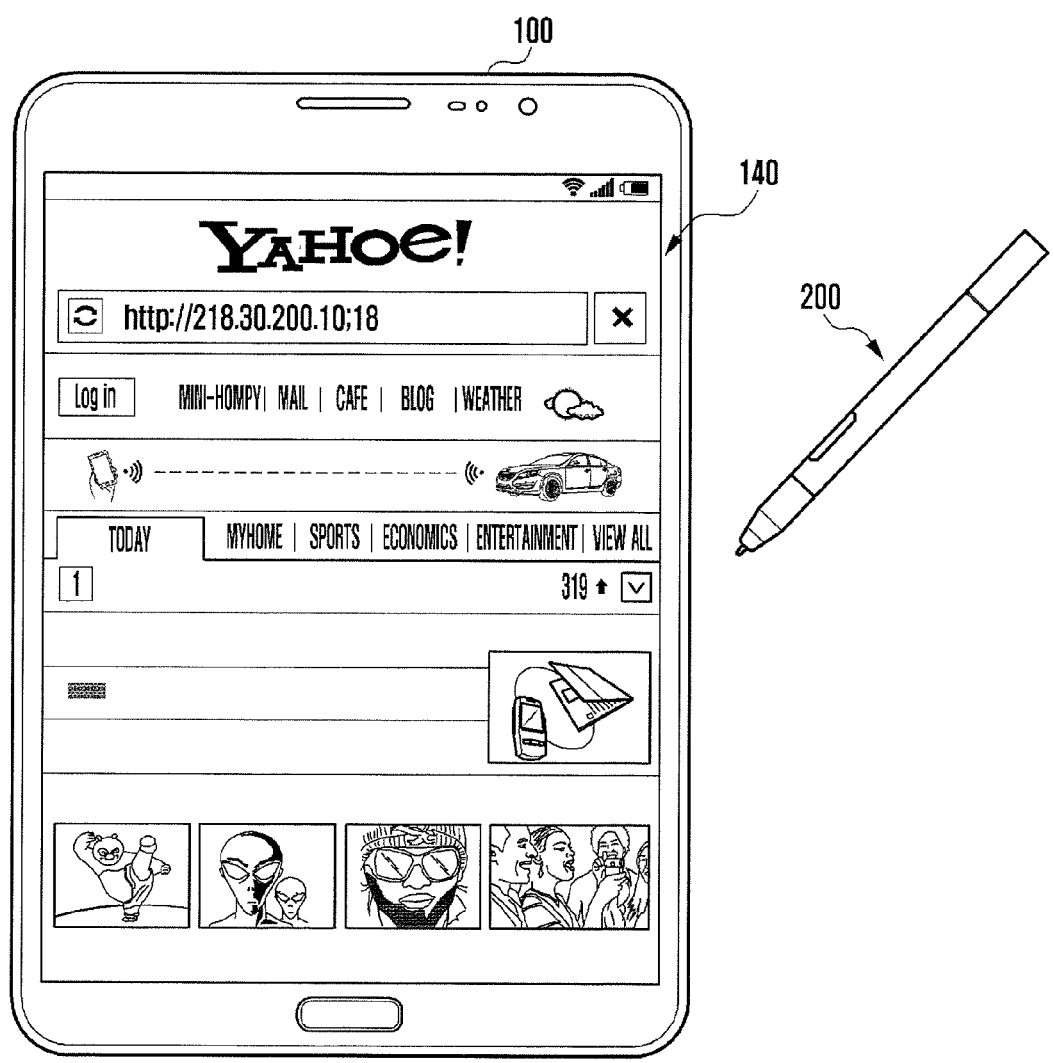
FIG. 1 is a schematic view illustrating a touch sensitive device and a touch pen in accordance with an embodiment of the present disclosure.

FIG. 1 is a schematic view illustrating a touch sensitive device and a touch pen in accordance with an embodiment of the present disclosure.

Referring to FIG. 1, the touch sensitive device 100 and the touch pen 200 may constitute a system 10 configured for a touch-based content manipulation according to this disclosure.

In the system 10, a user can select a desired one of contents displayed on a screen of the device 100 by using the touch pen 200, for example, by drawing a closed curve around the desired content with the touch pen 200. Then the device 100 visually offers one or more available user functions associated with the selected content such that a user can rapidly select and use a desired user function.

The touch pen 200 creates various input events for the device 100. Specifically, after separation from a pen receiver of the device 100, the touch pen 200 may create a pen hover event, a pen contact event, or a gesture event after a pen contact, depending on a distance from a pen touch panel of the device 100. The touch pen 200 may be an electromagnetic induction type pen capable of creating input events on the pen touch panel. In some embodiments, the touch pen 200 may have a configuration such as shown in FIG. 2.

Figure 2:
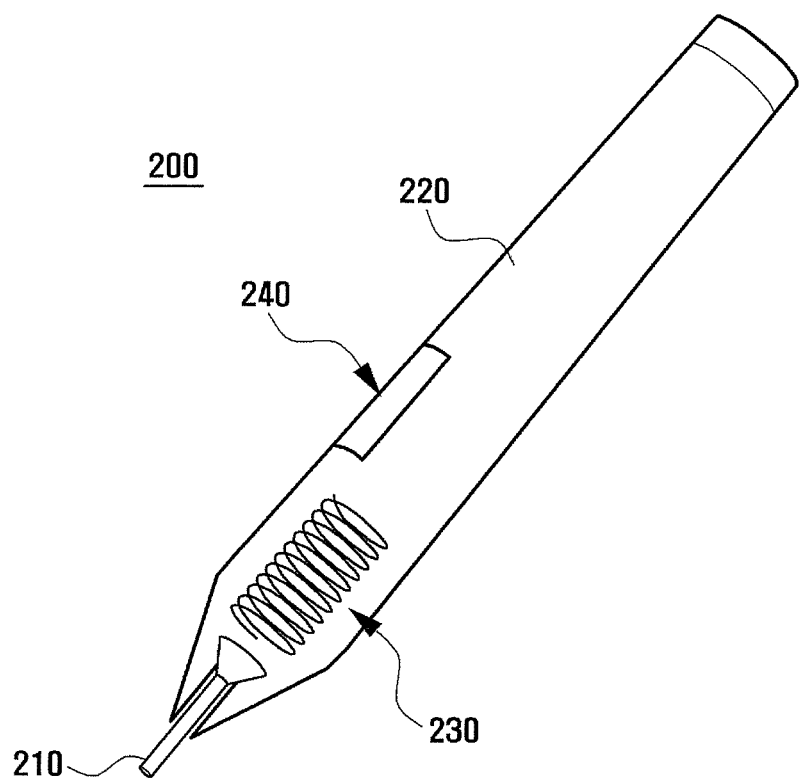
FIG. 2 is a schematic view illustrating the touch pen shown in FIG. 1.

Referring to FIG. 2, the touch pen 200 may include a pen point 210, a pen holder 220, a coil 230, and a pen button 240. With the pen holder 220 grasped, a user can touch or dispose the pen point 210 to or near a pen touch panel 145 such that an input event is created through electromagnetic induction between the coil 130 and the pen touch panel 145. Particularly, a user can immediately utilize a content manipulation function of this disclosure through the pen button 240. The pen button 240 is configured to vary the magnitude of electromagnetic induction formed on the pen touch panel 145 or create a wireless signal and then transmit it to the device 100. If a user performs a touch action on the pen touch panel 145 through the touch pen 200 with the pen button 240 being pressed, the device 100 can recognize a specific input event which is distinguished from any input event associated with a non-press of the pen button 240. Particularly, when the pen button 240 is pressed, a user can perform an action for forming a closed curve on the pen touch panel 145. If a user touches or disposes the pen point 210 to or near the pen touch panel 145 with the pen button 240 being released, the device 100 may recognize any input event depending on a state or action of the touch pen 200.

The device 100 is configured to support a touch-based content manipulation of this disclosure using the touch pen 200. Thus the device 100 may include the pen touch panel 145. Optionally, the device 100 may have a pen receiver for holding the touch pen 200. The pen receiver may be formed as an elongated groove which the touch pen 200 is inserted into or removed from. Also, any sensor or switch may be used for detecting an insertion or removal of the touch pen 200. Such a sensor or switch may be disposed near the pen receiver and detect mechanically, electrically or optically an insertion or removal of the touch pen 200.

The device 100 may visually offer a variety of contents through a display unit to a user. Such contents may include content pages provided by a web server or any other external server, specific contents associated with the execution of a selected user function such as a "My Files" function for providing files classified and stored by a user, idle screen contents, or any contents having corresponding icons or menu items. If the touch pen 200 draws any closed curve on the screen displaying various contents, the device 100 may collect images, text, metadata, and the like, regarding a specific region defined by the closed curve. Additionally, the device 100 may provide optional user functions in connection with the above region. For example, a user who desires to select one of the contents displayed and to use a specific user function associated with the selected content can crop a region corresponding to desired content by touching the touch pen 200 to the screen displaying various contents and then use a desired user function through a touch-based manipulation for the cropped region. Detailed configurations of the device 100 will be described hereinafter with reference to FIGS. 3 and 4.

Figure 3:
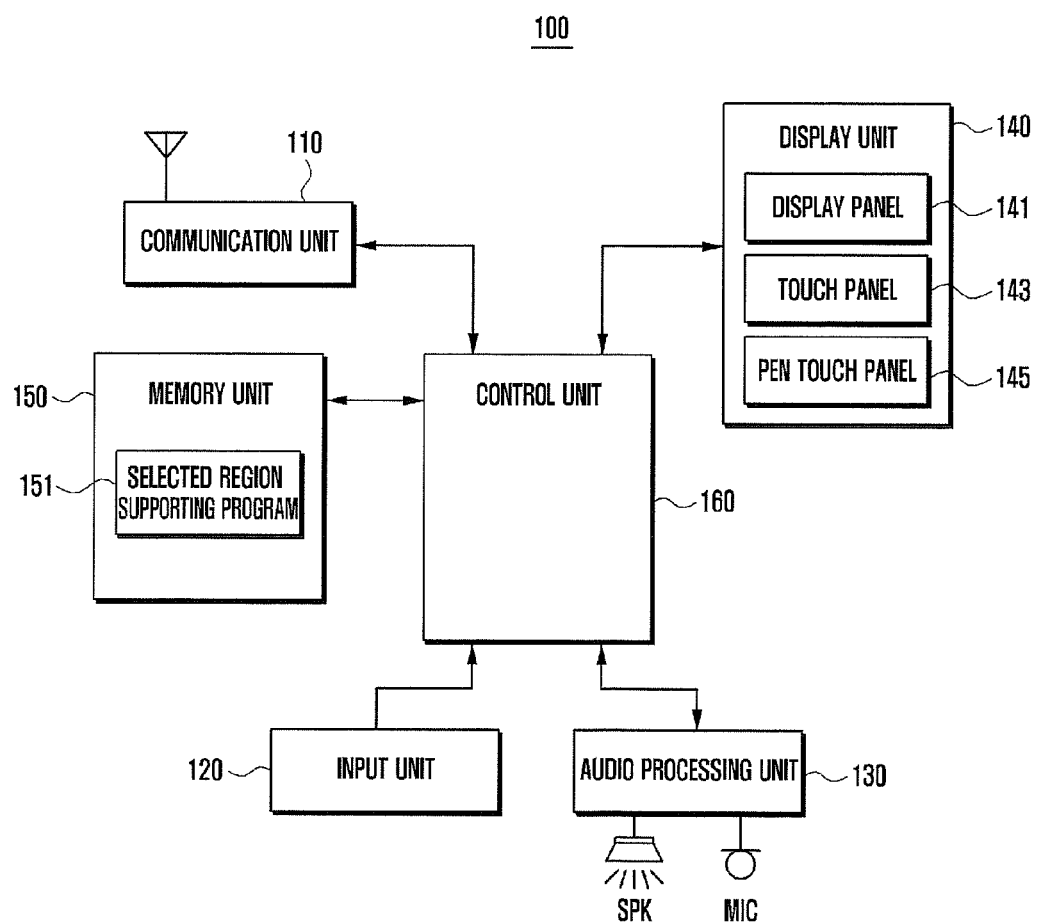
FIG. 3 is a block diagram illustrating a configuration of the touch sensitive device shown in FIG. 1.

FIG. 3 is a block diagram illustrating a configuration of the touch sensitive device 100 in accordance with an embodiment of the present disclosure.

Referring to FIG. 3, the device 100 may include a communication unit 110, an input unit 120, an audio processing unit 130, a display unit 140, a memory unit 150, and a control unit 160. In some embodiments, together with the input unit 120, the display unit 140 performs a function as an input device.

The device 100 may select (i.e., crop) a specific region of contents through the touch pen 200 and then perform a specific user function associated with the selected region of contents. For this, the device 100 may receive a signal from the touch pen 200 through a pen touch panel 145, and recognize an input event corresponding to the received signal. Then, if the input event has a predefined form, the device 100 may support the selection of the content and the execution of a relevant: user function.

The communication unit 110 may establish a communication channel with other devices through a suitable network in order to support a communication function of the device 100 or form a communication channel with a specific server that provides a particular web service. If the device 100 has no communication function, the communication unit 110 may be removed from the device 100. In order to support a mobile communication function, the communication unit 110 may be provided in the form of a mobile communication module. For example, the communication unit 110 may establish at least one of a voice service channel, a video service channel, and a data service channel, and support transmission and reception of signals through a selected service channel. The device 100 may output various screens associated with user functions performed through the communication unit 110. For example, in case of a web access function, the communication unit 110 may receive any data corresponding to web pages from a web server or any other external server. The received data may be outputted as a web page screen to the display unit 140. If the communication unit 110 is activated to perform a call function, a screen associated with the call function may be outputted to the display unit 140. Such functions related to the communication unit 110 may be selected through the touch pen 200, and the selected region of contents may be used for a user function associated with a separate communication function.

The input unit 120 is an element that creates various input signals associated with the operation of the device 100. Depending on compatibility of the device 100, the input unit 120 may employ at least one of many input methods such as a keyboard, a keypad, key buttons, and the like. In some embodiments, the input unit 120 may be composed of the touch panel 143 and a virtual touch map displayed on the display panel 141. Also, the input unit 120 may be formed of the touch pen 200 and the pen touch panel 145. In this case, the input unit 120 may further have a button key to activate the touch pen 200. The input unit 120 may create input signals for invoking and activating a selected user function of the device 100.

The audio processing unit 130 may output audio data created during the operation of the device 100, audio data associated with the playback of audio files stored in the memory unit 150, audio data received from the external entities, and the like. Additionally, the audio processing unit 130 may support an audio data collecting function. For this, the audio processing unit 130 may have a speaker (SPK) and a microphone (MIC). Particularly, the audio processing unit 130 may output various audio signals when a region of contents is selected or a related manipulation is performed. For example, the audio processing unit 130 may output a predefined sound effect when the touch pen 200 draws a closed curve on the contents screen. Additionally, the audio processing unit 130 may output a predefined sound effect when a specific user function is invoked on the basis of the selected region of contents.

The display unit 140 is an element that offers various screens associated with the operation of the device 100. For example, the display unit 140 may offer an idle screen, a menu screen, a memo or email writing screen, a webpage screen, or the like. The display unit 140 may include the display panel 141, the touch panel 143, and the pen touch panel 145.

The touch panel 143 may be formed as a capacitive type panel, for example, and create a touch event by reacting with the touching object (e.g., a user's finger) that causes variations in capacitance. The pen touch panel 145 may be formed as an electromagnetic induction type panel, for example, and create a touch event by reacting with the touch pen 200 that causes variations in electromagnetic induction. The pen touch panel 145 may support electromagnetic induction caused by the coil 230 embedded in the touch pen 200 and transmit to the control unit 160 the location information associated with the occurrence of electromagnetic induction. The pen touch panel 145 may separately define a hovering state and a contact state according to the magnitude of electromagnetic induction that depends on a distance from the touch pen 200. Also, the pen touch panel 145 may recognize a signal of selecting the pen button 240 and transmit the signal to the control unit 160. If the pen button 240 is a separate wireless device, a wireless signal of the pen button 240 may be directly transmitted to the control unit 160.

The display panel 141 may output a screen associated with the operation of the device or the execution of a user function. In some embodiments, the display panel 141 may output various contents screens as discussed above. Also, the display panel 141 may output certain graphic effects that give a visual feedback for trace of the touch pen 200. Specifically, the display panel 141 may offer predetermined graphic effects at a point where the touch pen 200 is initially touched. Then the display panel 141 may offer graphic effects such as a solid or dotted line corresponding to a movement of the touch pen 200. If any closed curve is formed by trace of the touch pen 200, the display panel 141 may offer relevant graphic effects. Also, if two or more regions of contents are selected together, the display panel 141 may offer some graphic effects to distinguish the selected regions from each other. Related examples of a screen interface will be described later.

The memory unit 150 may store an operating system associated with the operation of the device 100, and also store data, applications, programs and algorithms associated with user functions. Further, the memory unit 150 may store images, text, videos, and the like, that constitute respective contents screens. Particularly, the memory unit 150 may include a selected region supporting program 151 in connection with the selection of a content region and the manipulation of a selected content region.

The selected region supporting program 151 may include a selection supporting routine for supporting the selection of a content region, and a manipulation supporting routine for supporting the use of a user function based on the selected content region. Specifically, the selection supporting routine may include a routine for activating the pen touch panel 145 when the touch pen 200 is separated from the pen receiver of the device, for activating the pen touch panel 145 at regular intervals, or for supplying power to the pen touch panel 145 and then scanning the touch pen 200 when there is an input signal for instructing the activation of the pen touch panel 145. Also, the selection supporting routine may include a routine for collecting a hovering event when the touch pen 200 approaches the pen touch panel 145 within a given distance, and a routine for detecting a contact of the touch pen 200 with the pen button 240 being pressed from the pen touch panel 145 and then activating a function to select a region of contents. This function to select a content region may be mapped with an input event that the touch pen 200 approaches the pen touch panel 145 within a given distance.

The selection supporting routine may include a routine for checking whether a trace of the touch pen 200 with the pen button 240 pressed forms a closed curve on the display unit 140, a routine for removing a trace when no closed curve is formed, and a routine for cropping a specific region defined by a closed curve. The cropped region of contents may include relevant image information, relevant text information, and contents screen information containing the cropped region. For a webpage contents screen, contents screen information may be URL information. For an e-book contents screen, contents screen information may be e-book page information. The selection supporting routine supports a function of a pen touch supporting module 161 of the control unit 160 and a function of a region detecting module 163 of the control unit 160, which will be described later.

The manipulation supporting routine may include a routine for providing a screen that allows a selection of at least one user function predefined or executable through a content region selected by the selection supporting routine, and a routine for transmitting information about the selected content region to the selected user function. If there is no selection of a user function regarding the selected content region, the manipulation supporting routine may transmit information about the selected content region to a predefined user function. The manipulation supporting routine supports a function of a function processing module 165 of the control unit 160, which will be described later.

The control unit 160 is an element that controls various signal flows and information collection and output associated with the content manipulation function according to embodiments of this disclosure. In some embodiments, the control unit 160 may have some modules as shown in FIG. 4.

Figure 4:
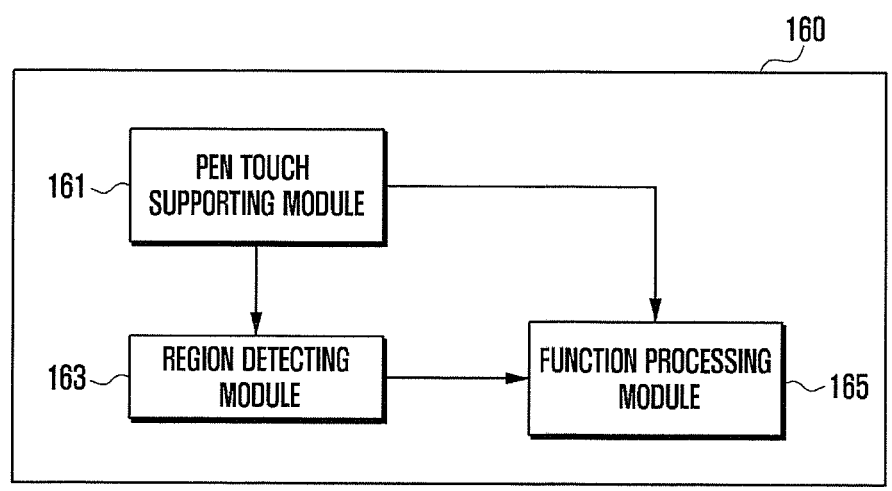
FIG. 4 is a block diagram illustrating a configuration of the control unit shown in FIG. 3.

FIG. 4 is a block diagram illustrating a configuration of the control unit 160 in accordance with an embodiment of the present disclosure.

Referring to FIG. 4, the control unit 160 may include the pen touch supporting module 161, the region detecting module 163, and the function processing module 165.

The pen touch supporting module 161 supports the operation of the touch pen 200 by the device 100. Specifically, the pen touch supporting module 161 may detect a separation of the touch pen 200 from the pen receiver by using a switch or sensor formed near the pen receiver. Also, when the touch pen 200 is separate from the pen receiver, the pen touch supporting module 161 may support the supply of power to the pen touch panel 145. Namely, the pen touch supporting module 161 may control the initialization of the pen touch panel 145. The pen touch supporting module 161 may collect various signals from the pen touch panel 145 and transmit the signals to the region detecting module 163. The pen touch supporting module 161 may receive a signal indicating a press of the pen button 240 from the touch pen 200 and then transmit to the region detecting module 163 a pen touch event resulting from the approach or contact of the touch pen 200 with the pen button 240 pressed. Additionally, if any pen touch event occurs according to the approach or contact of the touch pen 200 with the pen button 240 released, the pen touch supporting module 161 may directly transmit such a pen touch event to the function processing module 165 rather than to the region detecting module 163.

The pen touch supporting module 161 may support the output of a trace resulting from the approach or contact of the touch pen 200 to or with the pen touch panel 145. When the touch pen 200 is inserted again into the pen receiver, the pen touch supporting module 161 may stop the supply of power to the pen touch panel 145 and terminate the operation of the pen touch panel 145. Additionally, the pen touch supporting module 161 may differently support a representation of a trace resulting from a press of the pen button 240 and that of a trace resulting from a release of the pen button 240.

The region detecting module 163 checks whether any pen touch event received from the pen touch supporting module 161 forms a closed curve. If the received pen touch event fails to form a closed curve, the region detecting module 163 may ignore the pen touch event. If the formation of any closed curve is ascertained, the region detecting module 163 may support the output of predefined graphic effects for indicating a successful formation of a closed curve, depending on a user's setting or designer's intention. Alternatively, the region detecting module 163 may transmit any information associated with a closed curve to the function processing module 165 without any graphic effects.

When a closed curve is formed, the region detecting module 163 may collect information about a content region defined by the closed curve. Namely, the region detecting module 163 may collect image, text, link, screen, or metadata information contained in a specific content region defined by a closed curve. Such collected information may be transmitted to the function processing module 165. The region detecting module 163 may perform the determination of a closed curve according to various predefined criteria. Related examples will be described later.

The function processing module 165 supports various functions of the device 100. Particularly, the function processing module 165 may support processing of a content manipulation function of the disclosure. Namely, if information about a content region defined by a closed curve is received from the region detecting module 163, the function processing module 165 checks the received content region information. Then the function processing module 165 supports a selection of at least one user function predefined or executable using the content region information. If any specific user function is selected, the function processing module 165 may transmit information about a relevant region to the selected user function. The function processing module 165 may activate the selected user function, output a screen of the activated user function to the display unit 140, and dispose the region information at a certain point on the screen. Thereafter, the function processing module 165 may process any selected content region in response to an additionally received input signal or an input event created by the touch pen 200.

For example, the function processing module 165 may support transmission of content region defined by a closed curve to other device through an email service channel, a message service channel, a chatting service channel, or the like. Also, the function processing module 165 may support memo writing by outputting the selected content region on a memo screen. In addition, the function processing module 165 may support automatic saving of the selected content region in a predefined scrap note.

Figure 5:
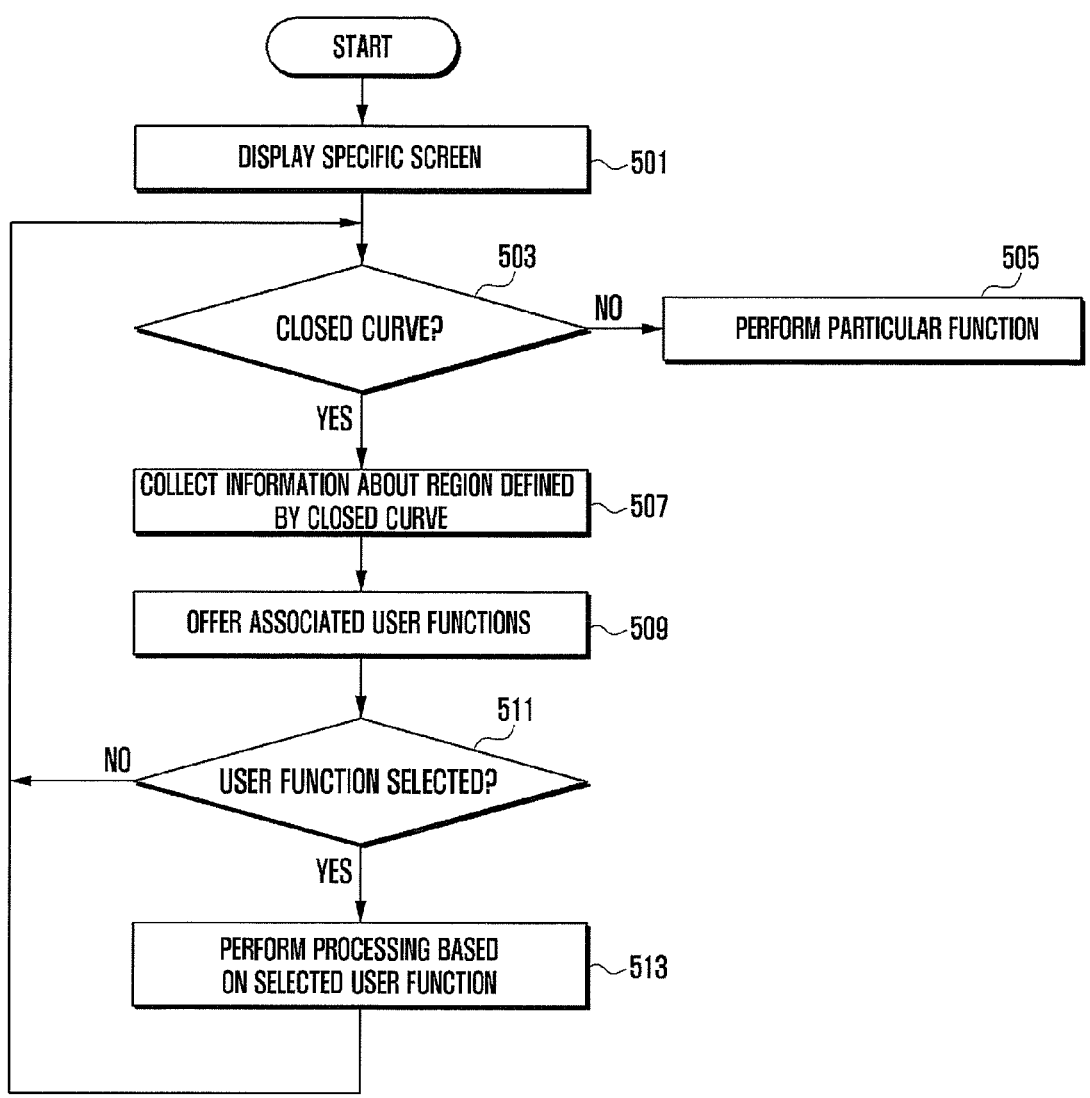
FIG. 5 is a flow diagram illustrating a method of a touch-based content manipulation in accordance with an embodiment of the present disclosure.

FIG. 5 is a flow diagram illustrating a method of a touch-based content manipulation in accordance with an embodiment of the present disclosure.

Referring to FIG. 5, at operation 501, the control unit 160 of the device 100 may output a screen associated with the execution of a specific function to the display unit 140. Specifically, the control unit 160 activates a specific user function according to predefined schedule information or in response to user's input, and outputs a specific screen in connection with the activated user function. For example, the control unit 160 may output an idle screen, a menu screen, or the like, depending on given schedule information. In some embodiments, the control unit 160 may organize an idle content screen by outputting predefined contents for the idle screen to the display unit 140. Also, the control unit 160 may output a predefined arrangement of menu items or a menu page to the display unit 140. In addition, the control unit 160 may output contents associated with a search function to the display unit 140.

The control unit 160 may support a function to operate the touch pen 200. For this, the control unit 160 may activate the pen touch panel 145 and detect the approach or contact of the touch pen 200. Particularly, the control unit 160 may check whether the touch pen 200 approaches the pen touch panel 145 within a given distance or is in contact with the pen touch panel 145 in a state of the pen button 240 being pressed. For this, the control unit 160 may receive a wireless signal resulting from a press of the pen button 240 from the touch pen 200 through a certain receiver, or receive variations of electromagnetic induction values resulting from a press of the pen button 240 from the pen touch panel 145.

At operation 503, the control unit 160 may determine whether there occurs any input event corresponding to a closed curve according to a predefined rule. Namely, through variations of electromagnetic induction values occurring from the pen touch panel 145, the control unit 160 may check whether any input event corresponding to a certain trace for forming a closed curve is created with the pen button 240 pressed. If an input event created at this point does not form a closed curve, the control unit 160 may perform at operation 505 a particular function associated with the created input event. For example, the control unit 160 may perform a function indicated by the touch pen 200, such as a display of a popup window for a handwriting function, a change of setting for the touch pen 200, an event processing for a drawing function by the touch pen 200, and the like. Additionally, even though any input event corresponding to a certain trace occurs from the touch pen 200 with the pen button 240 pressed, the control unit 160 may ignore the input event when the trace fails to form a closed curve.

If any closed curve is inputted according to a predefined rule at operation 503, the control unit 160 may collect information about a region defined by the closed curve at operation 507. Namely, the control unit 160 may collect image, text, URL, and/or any other metadata information associated with a specific content region defined by a closed curve. Thereafter, at operation 509, the control unit 160 may present at least one user function associated with such region information. Alternatively, the control unit 160 may present at least one user function used frequently through a selection of a content region. Namely, the control unit 160 may provide at least one user function based on user history regarding a selected content region and/or at least one user function executable through a selected content region.

Thereafter, if an input signal for selecting a user function is received at operation 511, the control unit 160 may perform region information processing based on the selected user function at operation 513. Namely, the control unit 160 may transmit to another device at least parts of images, text, URL information, and metadata information contained in the region information, create a memo containing the region information, upload the region information to any social network service supporting device, or transmit the region information to a specific edit program.

When a function to select a content region is completed, the control unit 160 may return to a previous screen, i.e., a specific function screen provided at operation 501. Additionally, if there is no selection of user function or if an input signal for canceling a selection of user function is received, the control unit 160 may return to operation 501. For example, a user can click a cancel button offered when a selected content region is outputted, or can perform an input action to select some region other than a selected content region. Also, the control unit 160 may store information about a selected content region in a buffer, and remove it from the buffer in response to an input event corresponding to a cancel action.

As discussed above, in embodiments of this disclosure, a user not only can easily select a desired one of contents displayed on the display unit 140 by using the touch pen 200, but also can rapidly and intuitively manipulate a desired one of user functions associated with the selected content.

Figure 6:
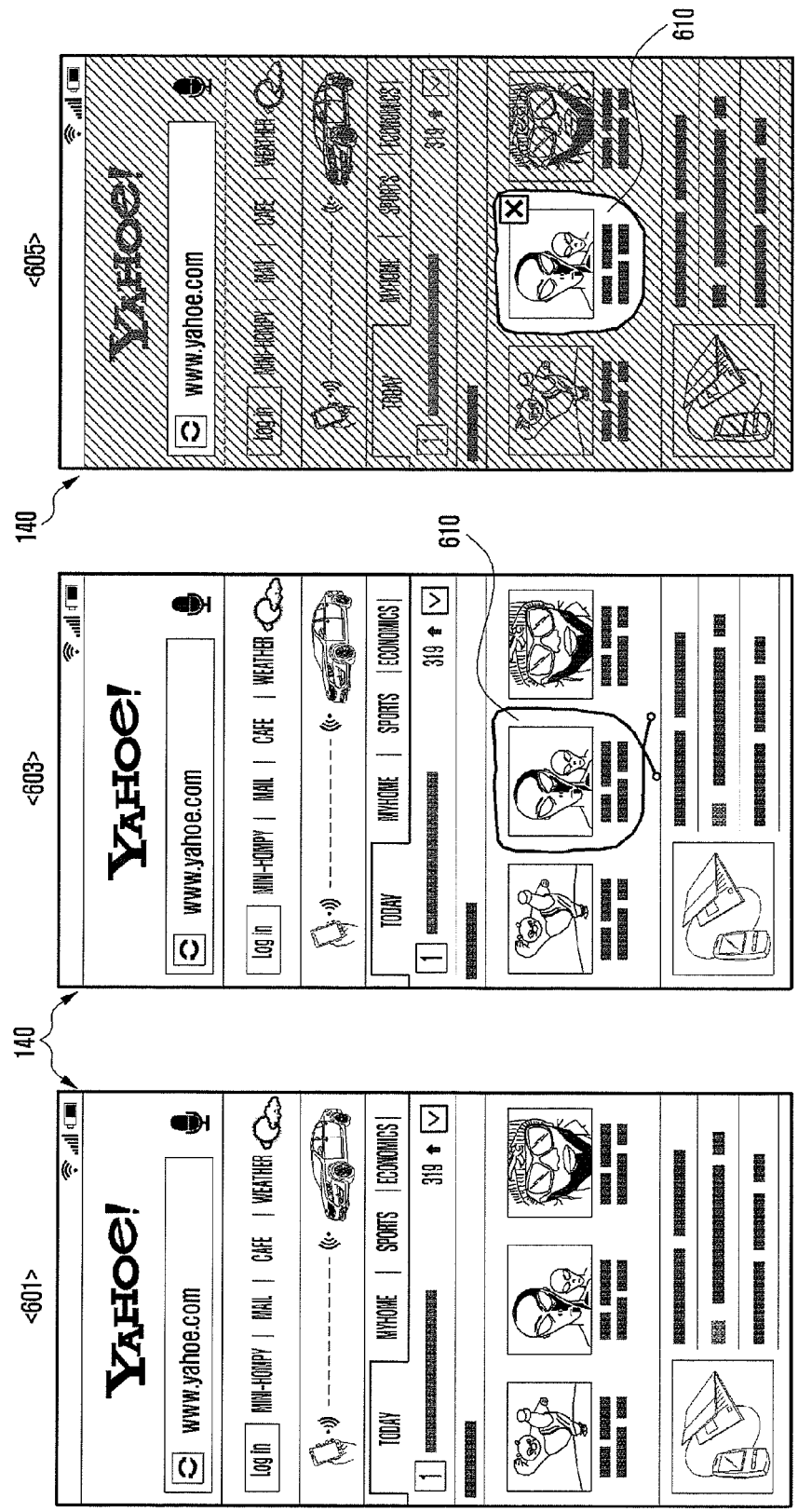
FIG. 6 illustrates screen interfaces for a touch-based content manipulation in accordance with an embodiment of the present disclosure.

FIG. 6 shows screenshots illustrating screen interfaces for a touch-based content manipulation in accordance with an embodiment of the present disclosure.

Referring to FIG. 6, the device 100 may display a specific content screen on the display unit 140 at a user's request. For example, when a user requests access to a specific web server, the device 100 may output a webpage content screen offered by the specific web server to the display unit 140 as shown in screenshot 601. For this, the device 100 may activate the communication unit 110 and establish a communication channel with a specific web server corresponding to a default address or any other address inputted by a user. Then the device 100 may receive a webpage content screen from the web server and output the received screen. A user can view information contained in the webpage content screen or conduct manipulations on the webpage.

For example, as shown in screenshot 603, a user can crop a partial region 610 of the webpage content screen. For this, a user may conduct a predefined input event, for example, may draw a closed curve on the display unit 140 with the touch pen 200 while pressing the pen button 240. If any closed curve is formed from a certain trace of the touch pen 200, the control unit 160 may crop the partial region 610 defined by the closed curve. Specifically, the control unit 160 may track a trace of the touch pen 200 from a contact start point to a contact release point on the display unit 140, and crop a specific region defined by at least one closed curve resulting from such traces.

After the touch pen 200 is released from the display unit 140, the control unit 160 may provide graphic effects for indicating that a partial content region 610 is successfully selected as shown in screenshot 605. For example, the control unit 160 may regulate the brightness of other regions in the screen except the selected region 610 as shown.

The control unit 160 may move the selected region 610 to a predefined position in the screen. For example, the control unit 160 may dispose again the selected region 610 at the center of the screen. As shown, a cancel button may be added to the selected region 610. If an input event for selecting the cancel button is received, the control unit 160 may remove the selected region 610 from the screen and return a previous screen as shown in screenshot 601. If any region except the selected region 610 is touched, the control unit 160 may regard this input event as a cancel button selection event. Additionally, if there is no input event for processing the selected region 610, the control unit 160 may transmit the selected region 610 to a default user function. For example, the selected region 610 may be automatically stored into a specific folder allocated to a scrap note in a memo function. A related user function will be described hereinafter with reference to FIG. 7.

Figure 7:
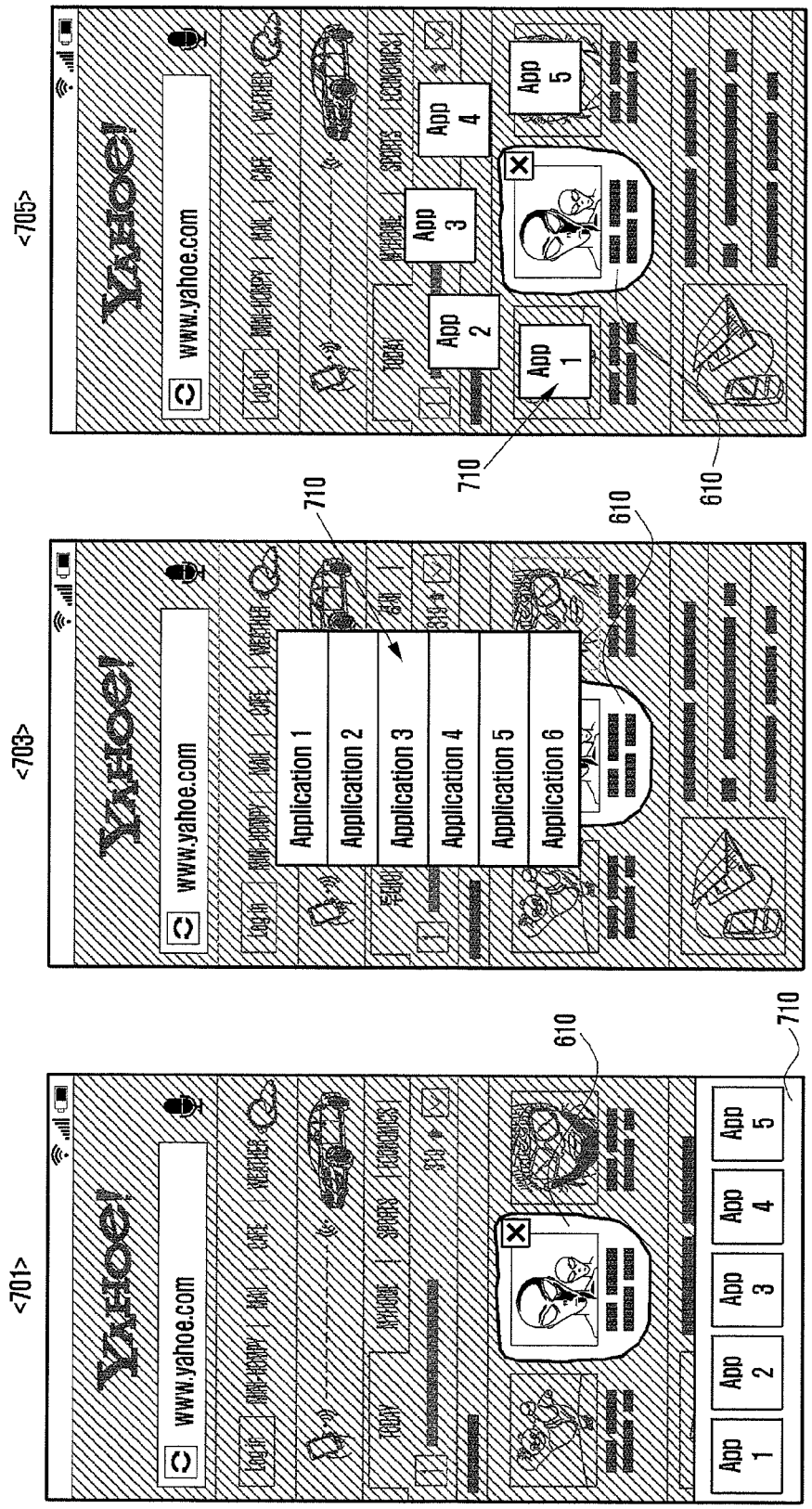
FIG. 7 illustrates examples of displaying user function items in a touch-based content manipulation in accordance with an embodiment of the present disclosure.

FIG. 7 shows screenshots illustrating examples of displaying user function items in a touch-based content manipulation in accordance with an embodiment of the present disclosure.

After a specific region 610 of the content screen is selected by the touch pen 200 with the pen button 240 pressed, the control unit 160 may check information about the selected region 610 and then offer various user function items 710 associated with the region information at the bottom of the screen as shown in screenshot 701. These items 710 may be displayed in an overlay form on the content screen. The number of the user function items 710 may be varied according to a user's setting or the size of the display unit 140. Namely, even though five items 710 are shown in screenshot 701, this number may be reduced or increased depending on the size of the display unit 140.

Alternatively, as shown in screenshot 703, the user function items 710 may be displayed in a list form. This list of the items 710 may also be displayed in an overlay form on the selected region 610. Even though six items 710 are shown in screenshot 703, this number may be varied according to user's setting or the size of the display unit 140. Alternatively, as shown in screenshot 705, the user function items 710 may be arranged around the selected region 610. For example, these items 710 may be disposed in a fan-shaped arrangement. Even though the user function items 710 are separated from each other in screenshot 705, the items 710 may be partially overlapped with each other or with the selected region 610.

Respective user functions indicated by the user function items 710 may be predefined user functions or executable user functions in connection with the region information of the selected region 610. Such user function items 710 may be selectively offered depending on user history.

Figure 8:
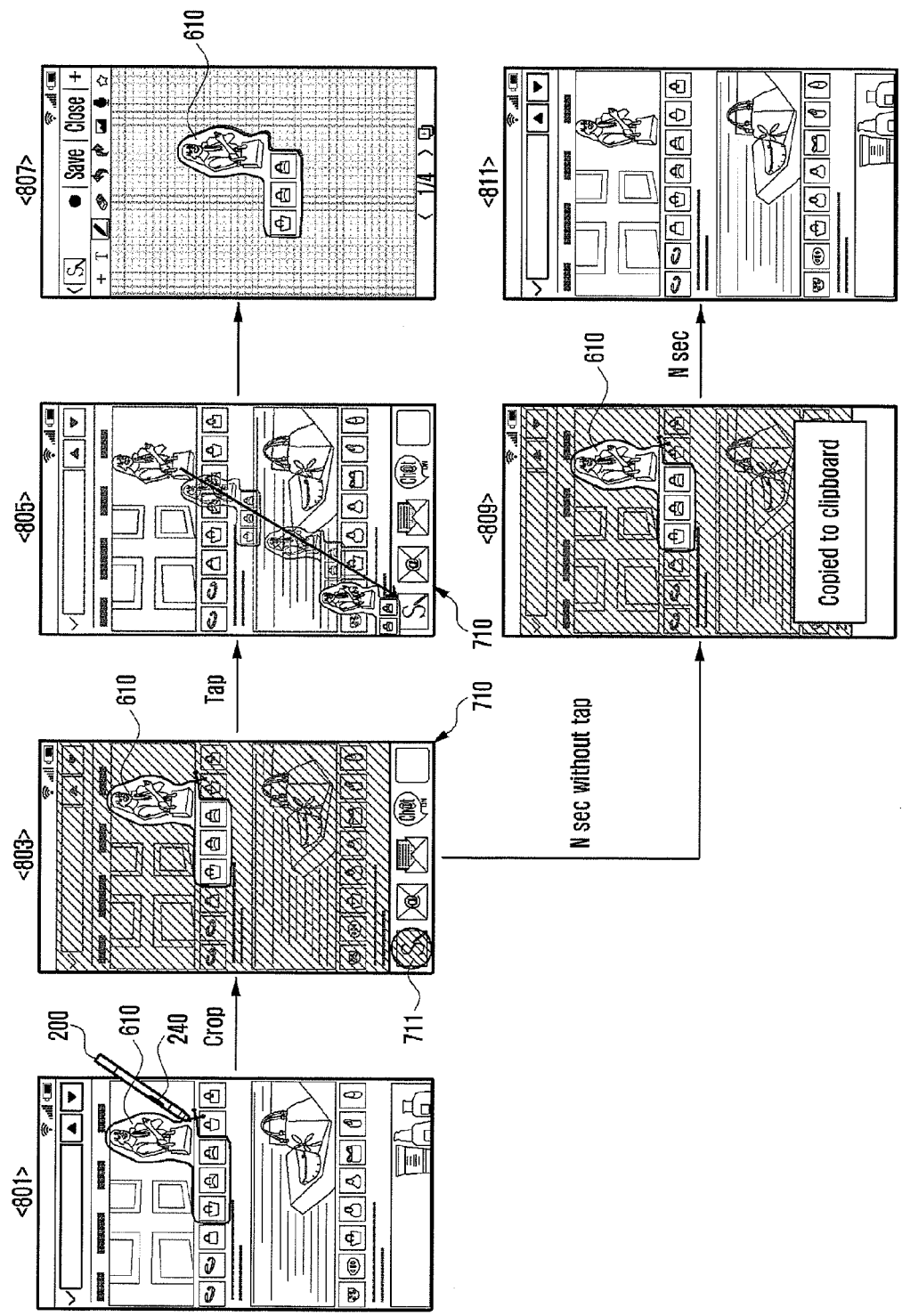
FIG. 8 illustrates a touch-based content manipulation in accordance with an embodiment of the present disclosure.

FIG. 8 shows screenshots illustrating a touch-based content manipulation in accordance with an embodiment of the present disclosure.

Referring to FIG. 8, a user may attempt to access a specific web site through a communication function of the device 100. For this, the device 100 may receive address information about the specific web site and, based thereon, establish a communication channel with a web server that provides the specific web site. Then, as shown in screenshot 801, the device 100 may display on the display unit 140 a content screen, e.g., an item purchasing screen, provided by the web server.

While viewing the item purchasing screen, a user may want to select or crop a specific item. Then a user may create an input event for selecting a desired item. For example, as shown in screenshot 801, a user may draw a closed curve around a desired item on the content screen by using the touch pen 200 with pen button 240 pressed. When this input event is received, the device 100 may determine whether the received input event corresponds to an action to form a closed curve. In case of an action to draw a closed curve, the device 100 may detect location information about the closed curve and retrieve information about the content screen currently displayed on the display unit 140. Then the device 100 may crop a specific region defined by the closed curve and also allocate the cropped region to a selected content region 610.

Additionally, as shown in screenshot 803, the device 100 may apply predefined graphic effects to the display unit 140 to indicate that the content region 610 is successfully selected. Thereafter, the device 100 may display on the screen the user function items 710 associated with the selected region 610. If a user selects a memo function item 711, the device 100 may offer graphic effects for indicating a delivery of the selected region 610 toward the memo function item 711 as shown in screenshot 805 and then activate a memo function as shown in screenshot 807. Namely, as shown in screenshot 807, the device 100 may output a screen associated with the memo function to the display unit 140 and also arrange the selected region 610 at a specific position of the screen. The device 100 may maintain or resize the size of the selected region 610. Additionally, even after the selected region 610 is displayed on the screen, the device 100 may allow resizing of the selected region 610 through the touch pen 200.

If no user function items 710 are selected for a given time at screenshot 803, the device 100 may transmit the selected region 610 to a predefined user function, e.g., a clipboard function, as shown in screenshot 809. Thereafter, as shown in screenshot 811, the device 100 may return to the initial screen.

Figure 9:
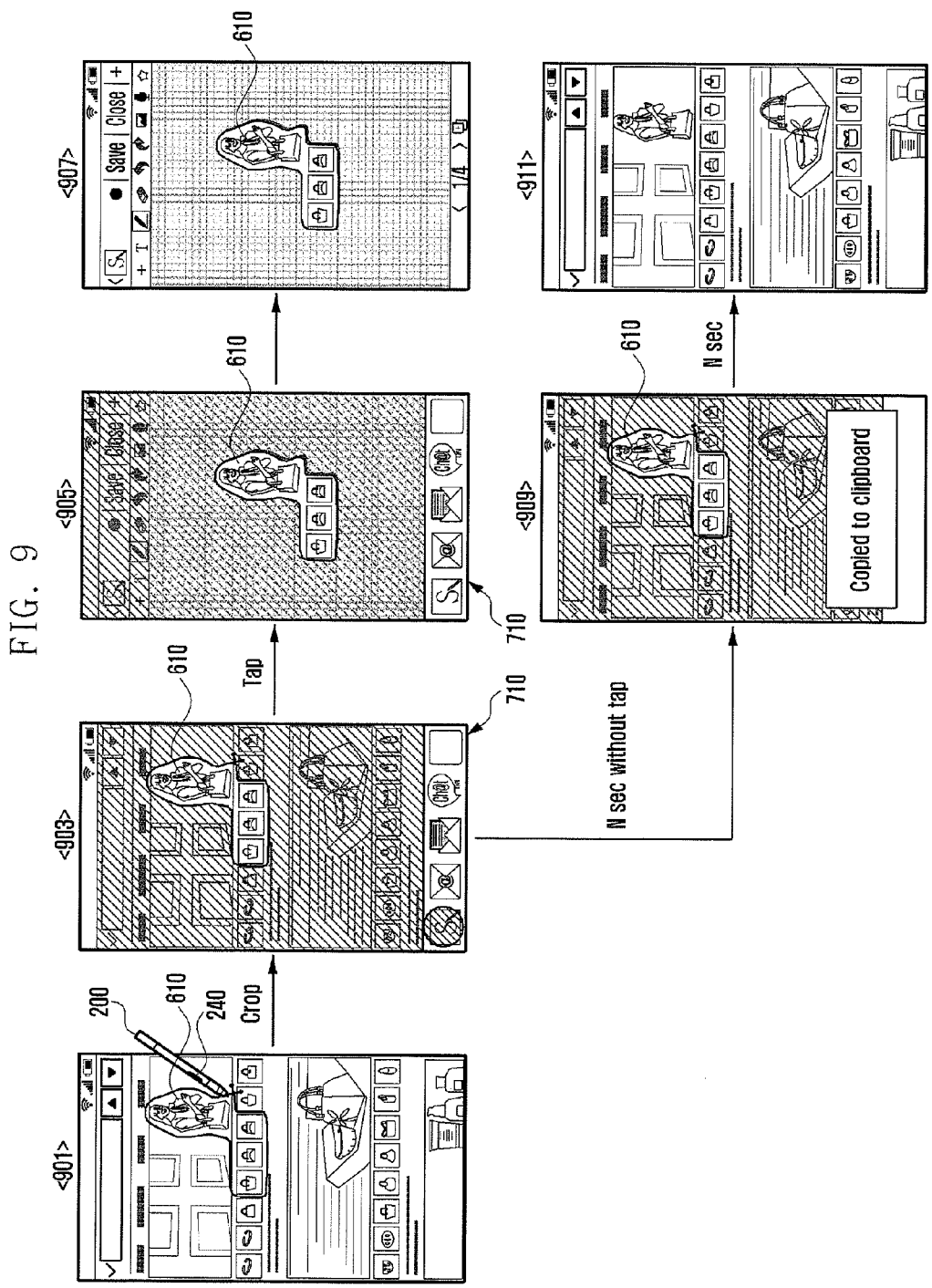
FIG. 9 illustrates a touch-based content manipulation in accordance with another embodiment of the present disclosure.

FIG. 9 shows screenshots illustrating a touch-based content manipulation in accordance with another embodiment of the present disclosure. In FIG. 9, screenshots 901, 903, 909 and 911 are substantially equal to the above-discussed screenshots 801, 803, 809 and 811 in FIG. 8. Therefore, a detailed description of these screenshots will be omitted.

After the partial content region 610 is selected and then a specific one (e.g., the memo function item 711) of the user function items 710 is selected as shown in screenshot 903, the device 100 may activate a memo function and replace a current screen with a memo function screen as shown in screenshot 905. Also, any graphic effects provided in response to a selection of the content region 610 may be removed after an elapse of a given time as shown in screenshot 907.

Figure 10:
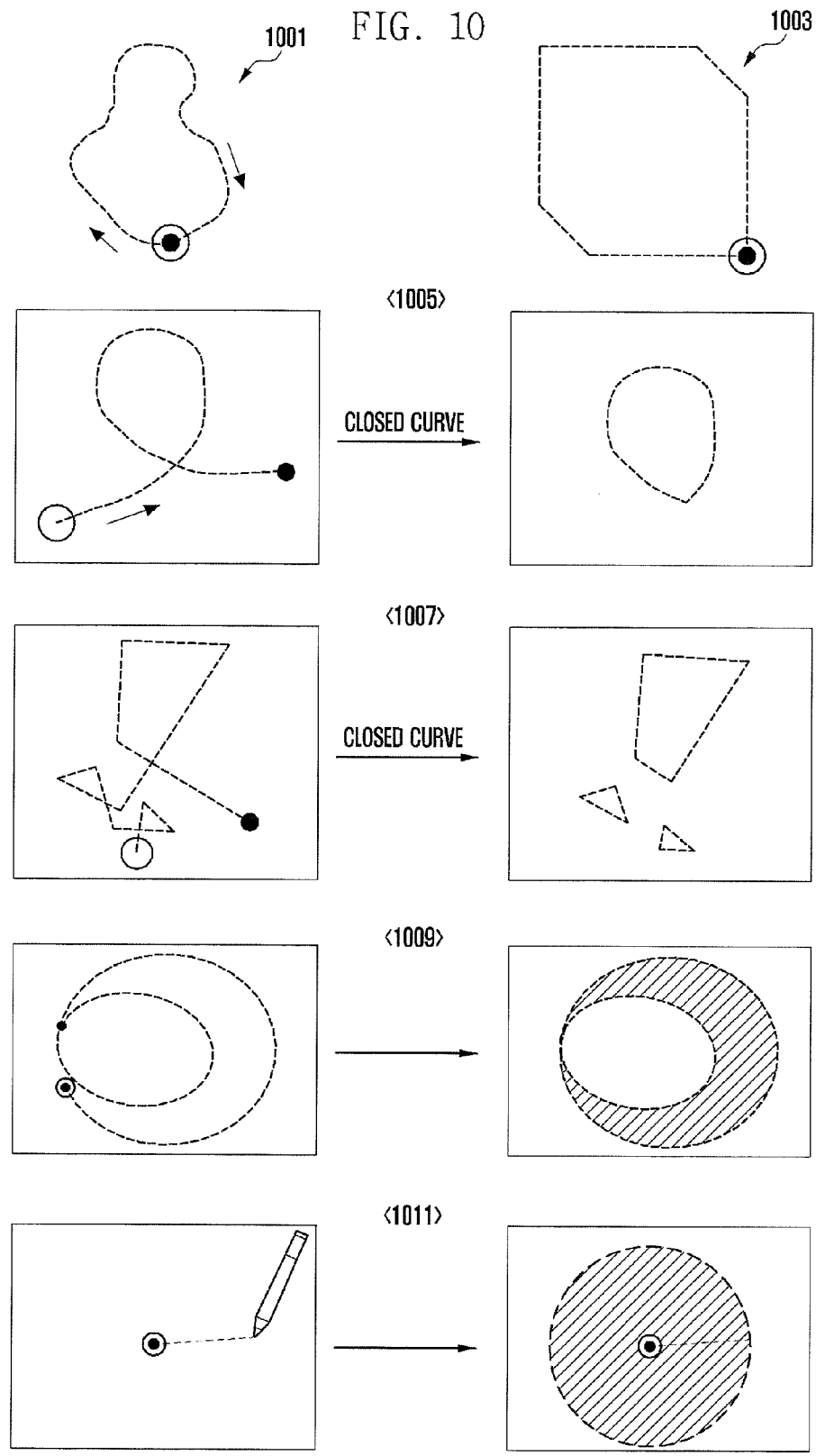
FIG. 10 shows examples of determining a closed curve in accordance with an embodiment of the present disclosure.

FIG. 10 shows examples of determining a closed curve in accordance with an embodiment of the present disclosure.

Referring to FIG. 10, as indicated by reference number 1001, a user may touch any point on the display unit 140 and then draw a free curve terminating at the touch point by using the touch pen 200 with the pen button 240 pressed. This closed curve resulting from a trace of the touch pen 200 defines the above-discussed specific region 610. As indicated by reference number 1003, the closed curve may be formed from a polygonal trace.

The device 100 may determine the content region 610 on the basis of a closed curve created from a trace of the touch pen 200 regardless of starting and terminating points of the trace. As indicated by reference number 1005, a single closed curve produces a single plane. All parts of a trace that are not contained in a closed curve may be ignored when the content region 610 is determined.

As indicated by reference number 1007, any trace may form several closed curves each of which produces a separate individual plane. In this case, each individual plane defined by a closed curve may be determined as the content region 610. Therefore, the device 100 may perform a process of determining the content region 610 during a time period corresponding to starting and terminating points of the trace.

As indicated by reference number 1009, a trace may form two different closed curves which further produce an internal plane within a certain plane. In this case, the device 100 may exclude such an internal plane from the content region 610, so that a ring-shaped plane is determined as the content region 610.

As indicated by reference number 1011, an input event that draws a segment of a line by using the touch pen 200 may occur. In this case, the device 100 may regard the line segment as a radius or diameter, create a circle or ellipse having the radius or diameter, and determine the circle or ellipse as the content region 610.

Figure 11:
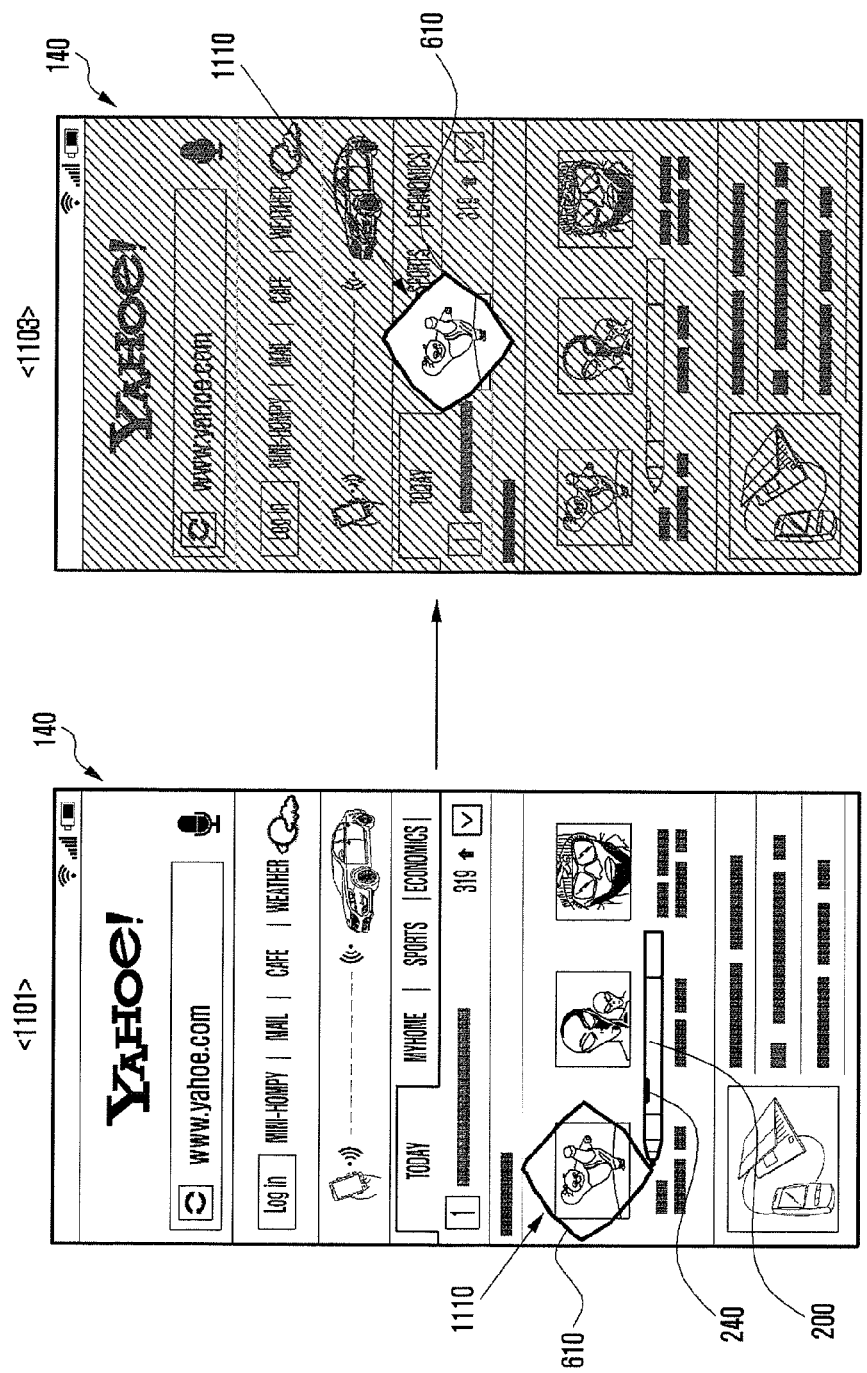
FIG. 11 illustrates the acquisition of a content region in accordance with an embodiment of the present disclosure.

FIG. 11 shows screenshots illustrating the acquisition of a content region in accordance with an embodiment of the present disclosure.

Referring to FIG. 11, the device 100 may output a specific content screen to the display unit 140 as shown in screenshot 1101. Such a content screen may have a plurality of sub-contents such as images, text, and the like.

Using the touch pen 200, a user may draw a closed curve for defining the content region 610 to select the first sub-content 1110 among all sub-contents displayed on the display unit 140. The pen button 240 of the touch pen 200 may be pressed. A closed curve may be drawn to enclose some portions of the first sub-content 1110. In this case, if a given percentage or more of the first sub-content 1110 is enclosed within the content region 610 defined by a closed curve, the device 100 may crop the entire first sub-content 1110 as shown in screenshot 1103. Additionally, the device 100 may dispose the selected first sub-content 1110 at the center of the display unit 140 such that a user can easily recognize a successful cropping. The device 100 may display the content region 610 together with the first sub-content 1110 or display the first sub-content 1110 alone.

As discussed above, when a given percentage or more of a specific sub-content is enclosed within the content region 610 defined by a closed curve, the device 100 may entirely crop the specific sub-content. This affords some margins for error which may occur in drawing a closed curve.

FIG. 12 shows screenshots illustrating the acquisition of a content region in accordance with another embodiment of the present disclosure.

Referring to FIG. 12, the device 100 may output a specific content screen having a plurality of sub-contents to the display unit 140 as shown in screenshot 1201. Then a user may manipulate the touch pen 200 to obtain the content region 610 involving a specific sub-content. For example, a user may draw a closed curve around the second sub-content 1120 by using the touch pen 200 with the pen button 240 pressed.

The content region 610 defined by a closed curve may contain a portion of the first sub-content 1110 as well as the second sub-content 1120. In this case, the device 100 may crop only a specific sub-content. For this, the device 100 may check a percentage of sub-contents enclosed in the content region 610. Specifically, if a given percentage (e.g., fifty percent) or more of the second sub-content 1120 is enclosed within the content region 610 defined by a closed curve, the device 100 may crop the second sub-content 1120. In contrast, if no more than a given percentage of the first sub-content 1110 is enclosed within the content region 610 defined by a closed curve, the device 100 may not crop the first sub-content 1110. Therefore, in this case, the device 100 may obtain the content region 610 entirely containing the second sub-content 1120 except the first sub-content 1110 as shown in screenshot 1203.

Thereafter, when one of a number of user function items is selected, the device 100 may activate the selected item and display the content region 610 or the second sub-content 1120 on the screen associated with the selected item. Like the above-discussed case in FIG. 11, this case allows a user to easily and reliably obtain desired sub-content by means of a rough drawing action.

As fully discussed above, the device 100 recognizes a predefined input event using the touch pen 200, i.e., an input event corresponding to a trace having a closed curve on the display unit 140 with the pen button 240 pressed, as a signal for cropping the content region 610. Thus, by grasping the touch pen 200, pressing the pen button 240, and drawing a closed curve around a desired content region, a user can easily select the desired region from a content screen. Additionally, the device 100 may provide specific user functions associated with the selected content region 610 or frequently used. Thus, a user can rapidly and easily use a desired user function through the selected content region 610.

According to a digital convergence tendency today, the above-discussed touch sensitive device 100 may essentially or selectively further include any other elements such as a short-range communication module, a wired or wireless communication interface, an Internet communication module, a digital broadcast receiving module, and the like. As will be understood by those skilled in the art, some of the above-mentioned elements in the device 100 may be omitted or replaced with other elements.

The touch sensitive device 100 according to embodiments of this disclosure may be applied to various types of mobile communication terminals such as a cellular phone, a smart phone, a tablet PC, a handheld PC, a PMP (portable multimedia player), a PDA (personal digital assistant), a notebook, a portable game console, and the like.

Although the present disclosure has been described with an example embodiment, various changes and modifications may be suggested to one skilled in the art. It is intended that the present disclosure encompass such changes and modifications as fall within the scope of the appended claims.

What is claimed is:

1. A touch-based content manipulation method in a touch sensitive device, the method comprising:
   receiving a user input while a content screen is displayed on a display unit;
   determining whether the user input is a closed curve;
   cropping a content region corresponding to the closed curve in the content screen based on the determining, the content region having an initial position corresponding to a location of the closed curve in the content screen;
   responsive to cropping the content region, displaying the content region, the content region moved from the initial position to a predefined position of the content screen;
   extracting information from the content region;
   determining at least one application executable in connection with the extracted information based on a user history associated with the extracted information; and
   outputting to the display unit, at least one user function item corresponding to the determined at least one application,
   wherein the information comprises at least one of an image, a text, a URL, or metadata of the content region.

2. The method of claim 1, wherein the user input is created according to an approach of a touch pen to or a contact of the touch pen with the display unit when a pen button of the touch pen is pressed.

3. The method of claim 2, wherein the user input is created according to electromagnetic induction resulting from the approach or contact of the touch pen.

4. The method of claim 1, wherein the cropping comprises at least one of:
   if a predetermined percentage or more of a sub-content in the content screen is enclosed within the content region, obtaining an entire sub-content; and
   if less than a predetermined percentage of the sub-content is enclosed within the content region, excluding the sub-content from the content region.

5. The method of claim 1, wherein the outputting comprises at least one of:
   disposing the at least one user function item at a bottom of the display unit;
   disposing the at least one user function item in a list form near the cropped content region; and
   disposing the at least one user function item around the cropped content region.

6. The method of claim 1, further comprising:
   providing a visual effect to a portion of the content screen, the portion excluding the cropped content region.

7. The method of claim 1, wherein the determining includes:
   determining whether at least one closed curve is formed by a trace of a touch pen from a touch starting point to a touch releasing point.

8. The method of claim 7, wherein the determining further includes at least one of:

if two or more closed curves are formed by the trace, determining each plane produced by each closed curve as the content region; and if two different closed curves which produce an internal plane within a certain plane are formed by the trace, determining a ring-shaped plane as the content region from which the internal plane is excluded.

9. The method of claim 7, wherein the determining further includes:

determining a circle or ellipse as the content region, the circle or ellipse having the trace as a radius or diameter.

10. A touch-sensitive device for supporting a touch-based content manipulation, the touch-sensitive device comprising:

a display unit configured to display a content screen; and a control unit configured to:
receive a user input while the content screen is displayed on the display unit,
perform a determination whether the user input is a closed curve,
crop a content region corresponding to the closed curve in the content screen based on the determination, the content region having an initial position corresponding to a location of the closed curve in the content screen,
display the content region, the content region moved from the initial position to a specific position of the content screen in response to cropping the content region,
extract region information from the content region,
determine at least one application executable in connection with the extracted information based on user history associated with the extracted information and
output to the display unit, at least one user function item corresponding to the determined at least one application,
wherein the region information comprises at least one of an image, a text, a URL, or metadata of the content region.

11. The touch-sensitive device of claim 10, further comprising:

a touch pen configured to create the user input; and a pen touch panel configured to receive the user input according to an approach of a touch pen to or a contact of the touch pen with the display unit when a pen button of the touch pen is pressed.

12. The touch-sensitive device of claim 11, wherein the pen touch panel is further configured to receive the user input according to electromagnetic induction resulting from the approach or contact of the touch pen.

13. The touch-sensitive device of claim 10, wherein the control unit is further configured to, if a predetermined percentage or more of a sub-content in the content screen is enclosed within the content region, obtain an entire sub-content, and if less than a predetermined percentage of the sub-content is enclosed within the content region, exclude the sub-content from the content region.

14. The touch-sensitive device of claim 10, wherein the display unit is further configured to display at least one of:

the at least one user function item, displayed at a bottom of the display unit;

the at least one user function item, displayed in a list form near the cropped content region; and the at least one user function item, displayed around the cropped content region.

15. The touch-sensitive device of claim 10, wherein the display unit is further configured to provide a visual effect to a portion of the content screen, the portion excluding the cropped content region.

16. The touch-sensitive device of claim 10, wherein the control unit is further configured to determine whether at least one closed curve is formed by a trace of a touch pen from a touch starting point to a touch releasing point.

17. The touch-sensitive device of claim 16, wherein the control unit is further configured to, if two or more closed curves are formed by the trace, determine each plane produced by each closed curve as the content region, or if two different closed curves which produce an internal plane within a certain plane are formed by the trace, to determine a ring-shaped plane as the content region from which the internal plane is excluded.

18. The touch-sensitive device of claim 16, wherein the control unit is further configured to determine a circle or ellipse as the content region, the circle or ellipse having the trace as a radius or diameter.

* * * * *